United States Patent [19]

Brendel

[11] Patent Number: 4,910,842

[45] Date of Patent: Mar. 27, 1990

[54] ROLL FOR THE PRESSURE TREATMENT OF WEBS OF MATERIAL

[75] Inventor: Bernhard Brendel, Muelhausen, Fed. Rep. of Germany

[73] Assignee: Eduard Küsters Maschinenfabrik GmbH & KG, Co. Krefeld, Fed. Rep. of Germany

[21] Appl. No.: 119,586

[22] Filed: Nov. 12, 1987

[30] Foreign Application Priority Data

Nov. 14, 1986 [DE] Fed. Rep. of Germany ....... 3639009

[51] Int. Cl.$^4$ ............................................. B21B 31/00
[52] U.S. Cl. ...................................... 29/110; 162/272; 100/162 B; 100/170; 100/176; 248/562; 248/636
[58] Field of Search .................. 29/110; 162/272, 358, 162/361; 100/162 B, 168, 170, 172, 176; 248/562, 569, 636

[56] References Cited

U.S. PATENT DOCUMENTS

| 3,926,114 | 12/1975 | Matuschke | 101/142 |
|---|---|---|---|
| 4,100,662 | 7/1978 | Metso | 29/110 |
| 4,271,574 | 6/1981 | Matikainen | 29/115 |
| 4,464,986 | 8/1984 | Bollani | 162/358 X |
| 4,487,122 | 12/1984 | George et al. | 100/162 B X |
| 4,520,723 | 6/1985 | Pav et al. | 100/162 B |
| 4,598,448 | 7/1986 | Schiel et al. | 29/116 |
| 4,632,855 | 12/1986 | Conlon et al. | 29/132 X |
| 4,637,109 | 1/1987 | Bryer | 29/130 X |
| 4,683,627 | 8/1987 | Reinhold | 29/110 |
| 4,739,702 | 4/1988 | Kobler | 29/110 X |
| 4,803,877 | 2/1989 | Yano | 100/176 X |

FOREIGN PATENT DOCUMENTS

| 844321 | 6/1970 | Canada . |
| 321994 | 6/1920 | Fed. Rep. of Germany . |
| 937319 | 1/1956 | Fed. Rep. of Germany . |
| 1561706 | 10/1970 | Fed. Rep. of Germany . |
| 3306838 | 8/1984 | Fed. Rep. of Germany . |
| 1194205 | 6/1970 | United Kingdom . |

Primary Examiner—Timothy V. Eley
Assistant Examiner—Frances Chin
Attorney, Agent, or Firm—Kenyon & Kenyon

[57] ABSTRACT

Apparatus for the pressure treatment of webs of material, such as the wet section of a paper-making machine, including a damping device fixedly connected to the protruding end of the roll for damping vibrations of the roll occurring during rotation thereof. The damping device comprises a pair of annular mass rings which surround the protruding roll end and are resiliently supported within an enclosed housing which includes frictional elements bearing against the rings.

24 Claims, 2 Drawing Sheets

ROLL FOR THE PRESSURE TREATMENT OF WEBS OF MATERIAL

BACKGROUND OF THE INVENTION

The invention relates generally to a roll for the pressure treatment of webs of material, and more particularly to an improved damping device for reducing the vibratory motion of a hydraulically-supported roll or a conventional solid roll.

A roll of the type having a rotating hollow roll forming a working roll circumference at its outer diameter and a stationary cross piece extending through the hollow roll forming a clearance space therewith, with the cross piece having ends protruding from the hollow roll to which external forces may be applied for supporting the roll and means, including a liquid, for hydraulically supporting the hollow roll at the cross piece, constitutes a system which is able to vibrate with a number of degrees of freedom during operation of the roll as it rotates. The frequencies of the vibrations produced during rotation of the rotating hollow roll are approximately in the range of 80 Hz. when using a roll having a length of 4–10 m and roll diameter of 40–100 cm. The problem to which this invention is directed is the non-uniformity produced by the above-mentioned vibrations during treatment of the web of material.

This problem is especially prevalent in the wet press of a paper-making machine. In the wet press, these vibrations may lead to an irregular compaction pattern and, consequently, an irregular dewatering pattern. Thus, the paper webs have moisture contents which vary over the surface area of the web. Vibrations of the roller relative to the felt, i.e. vibrations in the plane transverse to the plane of the web, result in relatively large displacements and hence non-uniformities at the web center and web edges.

If the vibrations occur repetitively, i.e. one point of the web is exposed in every pass to a stronger compression in the roll gap than other points, the pattern formed in the web intensifies. Heretofore, one remedy to prevent this consisted of tensioning the web. This prevents areas of the web from getting into the roll gap rhythmically and exciting new vibrations further reinforcing their deviation from the adjacent regions.

In addition to the natural flexural vibrations of the cylinder and the cross head or cross piece of a hydraulically-supported roll causing non-uniform treatment of the web, displacements of the roll as a whole perpendicular to its axis also cause non-uniformities. An example of this is what is known as barring in a calender which is caused by the propagation of shocks through the roller stack when the rolls have equal diameters or diameters having a certain ratio to one another. This effect causes the appearance of cross stripes or bars in the treated paper. Previous solutions to this problem have been the selection of different roll diameters, lateral staggering of the rolls, and the provision of outer deflector rolls to avoid the simultaneous presence of vibration crests or vibration troughs in the roll gaps. This phenomenon is not limited to hydraulically-supported rolls having stationary cross heads and revolving cylinders but also occurs with conventional solid rotating rolls.

The problem of vibration of a roll causing non-uniform treatment of the web of material as it passes through the roll gap defined by a roll and a counter-roll has been recognized, as can be seen from DE-PS 15 61 706. This patent generally shows a roll for the pressure treatment of paper webs having a device for damping vibrations of the roll occurring during rotation thereof. The roll comprises a revolving cylinder and a stationary cross head piece extending lengthwise through the cylinder. The ends of the cross head protrude from the cylinder and form a roll neck for supporting the roll. Located within the cross head are piston-type pressure shoes which are positioned opposite each other in the active plane of the roll, i.e. in the working plane of the resultant of the forces exerted by the roller. The pistons can shift radially in cylinder-like grooves extending substantially over the working length of the roller to bear against the inner circumference of the cylinder. The grooves are filled with a pressurized liquid which forces the shoes against the inner circumference of the cylinder to create a largely uniform line pressure. Since the pressures in the mutually-opposite grooves act in opposite directions, the magnitude of the line pressure depends upon the difference between the pressures in the grooves. The cylinder spaces opposite each other in the active plane beneath the pressure shoes are connected by channels passing radially through the cross head which are arranged in close proximity to each other. The channels intersect a longitudinal bore in which a sealing piston is displaceable. Depending upon the position of the piston, one or more of the channels may be closed by the piston. The pressurized liquid can pass through the channels from one groove to another according to the pressure difference. Due to the small diameter of the channels, a throttle effect occurs based on the number of channels allowed to communicate by the piston. Thus, when vibrations occur, the throttle effect results in damping having an intensity which can be varied by opening or closing the channels.

One of the problems with the damping device in DE-PS 15 61 706 is that the damping effect actually attainable is small. The actual displacements of the cylinder relative to the cross head are very small, and correspondingly, only very small quantities of liquid pass through the channels. Thus, an appreciable throttle effect, and hence a noticeable damping, cannot be expected with this type of damping device.

DE-OS 33 06 838 also relates to the problems of vibration in rotating hollow rolls. This patent provides a damping element in the form of a liquid cushion positioned in the annular space between the cylinder and the cross head. The liquid cushion is formed by a piston bearing against the roll wall and moveable relative to the yoke. The piston separates the annular space from a liquid chamber containing the cushion liquid.

In a manner similar to DE-PS 15 61 706, one of the problems in DE-OS 33 06 838 is that the damping effect attainable is limited, because the damping is brought about by inappreciable fluid flow. Additionally, this type of device is not an effective solution to the damping problem, because it creates another problem or disadvantage in that the internal damping arrangement provided reduces the bending resistance of the cross head. The damping device provided is located in the region of the roll which produces the line pressure for supporting the hollow roll. Since accommodation must be made for the piston-type hydraulic elements in order to create the liquid cushion, valuable space or working area for supporting the cross head is lost, and hence the bending resistance of the cross head is diminished.

SUMMARY OF THE INVENTION

The present invention solves the problem of roll vibration without the use of a complicated internal damping structure by mounting an enclosed damping device on the protruding end or roll neck of an hydraulically-supported or conventional solid roll. The roll may be used for the pressure treatment of webs of material, such as the wet section of a paper-making machine. In one embodiment, the roll may comprise a rotating hollow roll forming a working roll circumference at its outer diameter with a stationary piece extending through the hollow roll forming a clearance space therewith, with the cross piece having ends protruding from the hollow roll to which external forces may be applied for supporting the roll and means, including a liquid, for hydraulically supporting the hollow roll at the cross piece.

Alternatively, the roll may comprise a conventional solid roll rather than an hydraulically-supported roll. In either case, the protruding end of the roll comprises an inner region connected to a structure supporting the roll and an outer region connected to the damping device. The damping device comprises an enclosed housing having an opening which receives the outer region without radial play and includes means for frictionally damping vibrations of the roll. The friction damping means may comprise an inertial mass surrounding the outer region and connected to the housing by a plurality of holding elements permitting radial movement of the mass whereby the mass is radially movable relative to the outer region and has a rest position concentric to the outer region. The inertial mass may comprise one or more mass rings having radial end faces positioned within a chamber in the housing, each of which is adjacent to a respective radial wall of the housing. Friction elements are positioned between the respective radial end faces and radial walls for frictionally damping vibrations of the roll. The damping device includes means for biasing the rings against the friction elements and means for adjusting the magnitude of the biasing force applied. The biasing means may take the form of a tubular elastic member located between the two mass rings and having a connection for receiving fluid pressure. The fluid pressure produces a biasing force which forces the mass rings apart and into frictional engagement with the frictional elements. Furthermore, a sensor may be provided which generates signals indicative of the vibrational amplitude of the roll which are operably connected to the means for adjusting the magnitude of the biasing force. The magnitude adjusting means may comprise a valve controlling the fluid pressure within the tubular elastic member whereby the biasing force applied is controlled as a function of the vibrational amplitude detected by the sensor. A damping device may be provided for both of the protruding ends of the roll.

DETAILED DESCRIPTION

Figure 1:
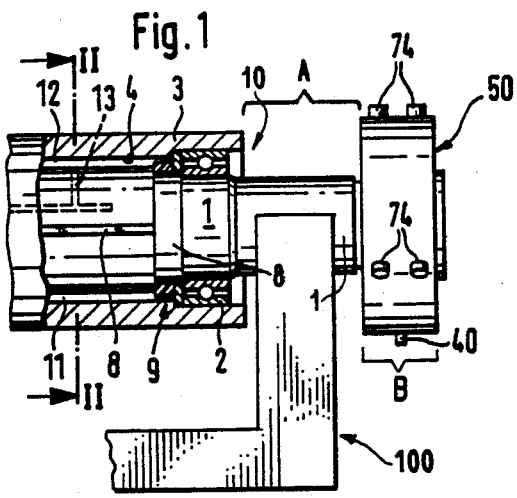
FIG. 1 is a longitudinal side view shown partly in section schematically illustrating a damping device constructed according to the principles of the invention connected to one type of hydraulically-supported roll.

FIG. 1 shows the right-hand side of a roll generally designated as 10 which comprises a stationary cross head or cross piece 1 in the form of a substantially solid and cylindrical support around which a hollow roll or cylinder 3 rotates. It is understood that the left-hand side of the roll may be of similar construction in each of the embodiments described herein, as only one side of the roll will be discussed in detail. The cross piece 1 extends through the hollow roll such that the inner circumference 4 of the cylinder 3 forms an annular clearance space with the outer circumference of the cross head 1. Cylinder 3 has an outer working circumference formed by its outer diameter which cooperates with an outer working circumference of a counter roll such as that shown at 6 in FIG. 2 to conduct a web of material through a roll gap 5 in a manner well known in the art.

The cross head 1 is rotatably supported on bearings 2 located within the roll in the vicinity of each of the ends of the cross piece. The ends or necks 1' of the cross head 1 protrude from the cylinder 3, and these protruding ends provide regions to which forces can be applied to the roll 10. Each protruding end 1' comprises a support region A adjacent to cylinder 3 to which the supporting structure attaching the roll to a machine frame or roll stand is connected, such as shown at 100. Outwardly located from support region A is a region B on which a damping device generally designated as 50 is connected to the protruding end 1' of the cross piece.

Figure 2:
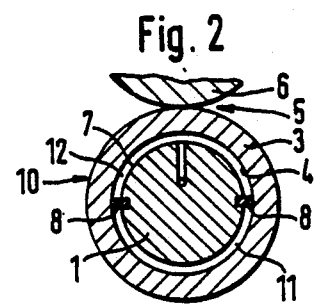
FIG. 2 is a cross-sectional view of the roll of FIG. 1 taken along lines II—II of FIG. 1.

The annular clearance space formed between the inner circumference 4 of cylinder 3 and the outer circumference 7 of cross head 1 disposed between each of the bearings 2 is subdivided by longitudinal seals 8 positioned on diametrically opposite sides of cross head 1 at approximately the mid-height thereof. End seals 9 are disposed inwardly adjacent to bearings 2 to seal the ends of the clearance space. Seals 8 and 9 thereby form two semi-annular chambers 11 and 12 with longitudinal chamber 12 positioned on the same side as rolling gap 5 as shown in FIG. 2. A feed line 13 is provided to introduce pressurized liquid into longitudinal chamber 1. The liquid bears against inner circumference 4 and the outer circumference 7 to support hollow roll 3. The clearance space formed allows the cross head 1 to flex under the action of the pressure in chamber 12 and produce the required line pressure without the cylinder 3 being affected thereby. Additionally, since the cylinder 3 is rotatably supported on the cross head 1 by bearings 2 axially fixed within cylinder 3, intentional flexing of cylinder 3 may be effectuated.

As is known in the art, as a web of material is fed through roll gap 5 hollow roll 3 rotates about cross piece 1 causing flexural vibrations of the cross head in the active plane, i.e. in the plane through the longitudinal axes of cylinder 3 and counter roll 6. During such vibrations, the end regions B experience deflections having certain amplitudes which are damped within the damping device 50 as subsequently described.

Figure 3:
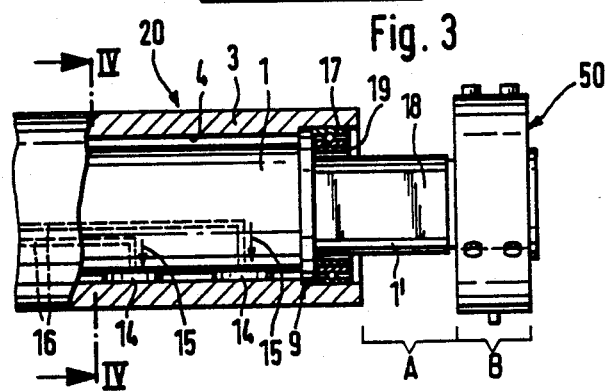
FIG. 3 is a longitudinal side view shown partly in section schematically illustrating the damping device of the present invention connected to the protruding end of another type of hydraulically-supported roll.
Figure 4:
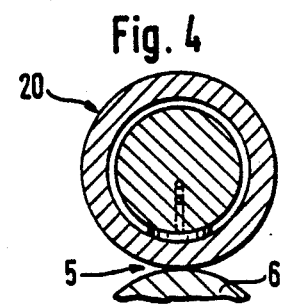
FIG. 4 is a cross-sectional view of the roll of FIG. 2 taken along lines IV—IV of FIG. 3.

FIGS. 3 and 4 show another type of hydraulically-supported roll fitted at its end with a damping device 50. Parts having the same function as those discussed in connection with FIGS. 1 and 2 will be designated with the same reference numerals. The roll 20 of FIG. 3 is internally supported by a hydraulic fluid via an arrangement which comprises a nonrotating cross head 1 about which cylinder or hollow roll 3 rotates. However, the support of cylinder 3 against cross head 1 in FIG. 3 occurs not through the pressure liquid contained in a longitudinal chamber extending throughout the length of the roller, such as shown in FIG. 1, but rather by means of individual support elements 14 axially spaced along the roll on the side of the roll gap 5. As shown in the cross sectional view of FIG. 4, the roll gap 5 lies at the bottom of cylinder 3 and cooperates with a counter roll 6 mounted therebeneath. The support elements 14 comprise piston-like members disposed in bores formed in the cross head 1. Elements 14 bear against the inner circumference 4 of roll 3 under the influence of hydraulic pressure within the bores acting on the elements 14 in the direction shown by arrows 15. Although bearings 17 rotatably support the cylinder 3, they do not transmit forces in the active plane as do the bearings 2 in the embodiment shown in FIG. 1. In FIG. 3, the ends of cross head 1 are flattened, as shown at sides 18, and are received by a ring 19 having a recess or cut-out corresponding to the cross section of region A. The bearings 17 are supported on ring 19 which is guided for axial movement on end 1' of the cross piece. Unlike the FIG. 1-2 embodiment, the cylinder 3 can shift longitudinally relative to the cross head 1 because of slidably mounted ring 19. In a manner similar to the embodiment shown in FIG. 1, support region A of the FIG. 3 embodiment is connected to a supporting structure such as a machine frame, and support region B is connected to a damping device 50.

Figure 5:
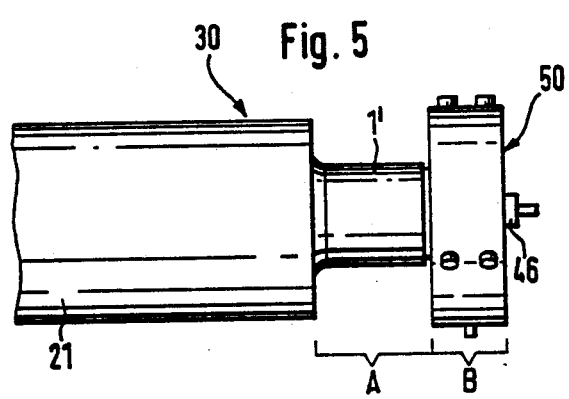
FIG. 5 is a longitudinal side view schematically illustrating the damping device of the present invention connected to a conventional solid roll.

FIG. 5 shows a solid roll of the conventional type having a roll body 21 consisting of a solid casting or forging having an offset diameter in region A for suspension in a machine frame. A damping device is connected to protruding end 1' at outer region B.

In all of the forms of rolls shown at 10, 20, and 30, the protruding end 1' carries the damping device 50. The features of rollers 10 and 20 may be interchanged, e.g. the floating roll 10 need not have bearings 2, and in roll 20, bearings such as shown at 2 in FIG. 1 may be provided for directly supporting cylinder 3 on the cross head.

Figure 7:
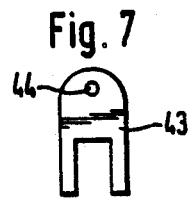
FIG. 7 is a plan view of the forked attachment piece shown in FIG. 6.
Figure 6:
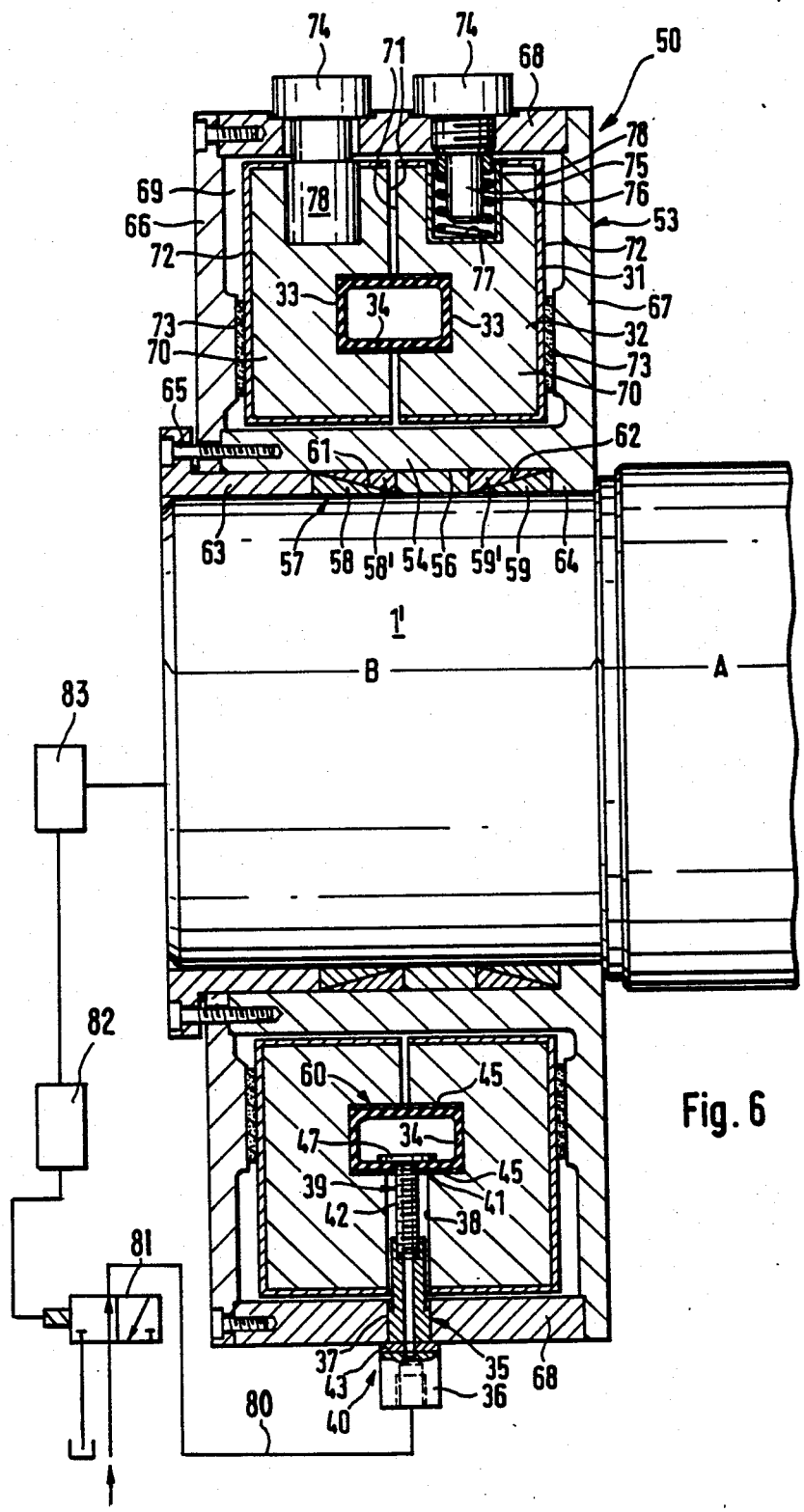
FIG. 6 shows a longitudinal sectional view of the damping device constructed according to the principles of the invention connected to an end of a roll.

FIGS. 6 and 7 show a damping device constructed according to the principles of the invention. The device is disposed on the outermost region B of the protruding end 1' of a roll 10, 20, or 30 heretofore described.

The damping device 50 comprises an annular housing 53 having a cylindrical inner wall 54 and a cylindrical opening 56 which surrounds the outer circumference of region B of protruding end 1' in spaced relation thereto. In this space, a cone-type clamping device 57 is provided having complementary ring pairs 58, 58', and 59, 59' each of which abut via a respective cone surface 61, 62. An axial force is exerted on conical ring 58 by a flange ring 63 extending into the space where clamping arrangement 57 is located. Clamping arrangement 57 bears against a collar portion 64 of housing 53 to transform the axial force of flange ring 63 into a radial clamping force which fixedly secures housing 53 to region B of the protruding end 1'. The axial force of flange ring 63 is created by tightening screws 65 in respective bores which are distributed around the circumference of inner wall 54.

At the axial ends of inner wall 54, annular-shaped radial walls 66 and 67 are connected to the inner wall 54. Radial walls 66 and 67 are connected at their radial outer ends by a cylindrical outer wall 68. Walls 54, 68, 66 and 67 of housing 53 define an annular chamber 69 in the interior of housing 53 which forms a space substantially filled by an inertial mass ring comprising two annular members 70. Members 70 are each provided with mutually opposing end faces 71 located in parallel radial planes forming a small clearance space therebetween. At their other axial end, members 70 each have radial end faces 72 which abut against a respective one of friction elements 73. Friction elements 73 are annular in shape and fastened to the inner surfaces of radial walls 66 and 67, respectively. Alternatively, the friction elements 73 may be fastened to annular member 70.

Annular members 70 may comprise hollow jacket rings 31 formed from thick sheet metal having a U-shaped cross-section. Jacket rings 31 are placed within chamber 69 with the open sides of the U facing each other and are filled with a heavy material 32, such as lead, to obtain a large inertial damping mass.

Annular members 70 can move radially within the interior chamber 69 of housing 53 within a certain range which is determined by the radial clearance distance of the inner and outer circumferential surfaces of the annular member 70 from the walls 54 and 68. In the normal or at rest position of the damping device, the annular members 70 are retained elastically by holding elements 74 in a concentric position about the longitudinal axis of protruding end portion 1'. The holding elements 74 are distributed uniformly over the circumference of annular members 70. For example, three holding elements 74 offset from each other by 120° may be provided to resiliently support each annular member 70. The holding element 74 may be formed as screws which are threaded into roll 68 from the outside. The threaded portion of the holding element 74 forms at its inner end a prolonged pin 75 which is surrounded by a spring 76 which bears against the bottom 77 of a bore 78 formed in the outer circumference of annular members 70. In this manner, annular members 70 are resilientally held at a radial distance from housing walls 54 and 68 and may be deflected a small radial distance against the force of springs 76.

Means for biasing the annular members 70 against the friction elements 73 is shown generally at 60.

The mutually opposing radial inner end faces 71 of annular members 70 are formed with annular grooves 33 at a radially-intermediate portion of each of the faces. Peripheral grooves 33, 33 of each of the annular members 70 face each other to form a rectangular cross-sectional area. The annular space formed by grooves 33, 33 contains a tubular elastic member 34 which substantially fills the total cross-sectional area of the two grooves 33, 33. At one point along the outer circumference of wall 68, a feed line generally designated as 40 in FIG. 6 is provided to conduct pressurized fluid to the interior of elastic member 34. Feed line 40 comprises a sleeve 35 having an internal longitudinal bore and an external head piece 36 connected thereto having an enlarged diameter for connection to a fluid pressure line schematically shown at 80. The sleeve 35 comprises a large diameter portion 37 guided in a radial bore of wall 68 without appreciable lateral play and a small diameter portion located radially inward from portion 37 which is guided in radial bore 38 of annular elements 70 with lateral play. The axis of radial bore 38 lies along the center line of the small radial clearance space formed between radial end faces 71. Radial bore 38 is formed from two approximately semi-cylindrical cut-outs provided in each annular member 70. Threaded into the inner end of the small diameter portion of sleeve 35 is a flanged member 39 which has a flange-type head 47 disposed in the interior of tubular elastic member 34. Threaded shank 42 of flanged member 39 connects flange head 47 to the inner end of sleeve 35. A threaded disk 41 is screwed against the outer surface of tubular elastic member 34 such that the flange sleeve 39 is connected with the tubular elastic member 34 in a leak-proof manner. The bores of sleeve 35 and of the flanged member 39 establish a fluid connection from the pressure connection head 36 to the interior of tube ring 34 for conducting pressurized fluid thereto. Sleeve 35 and flanged member 39 are mounted with radial play relative to the bore 38 in order that the mobility of the annular members 70 will not be impaired by the feed line 40 which is fixed to the outer wall 68. As better shown in FIG. 7, the sleeve 35 is flattened on both sides between the cylindrical part 37 and the connection head 36 so that a forked attachment piece 43 can be fitted thereon. Attachment piece 43 is fixed in the outer side of wall 68 by a screw threaded through bore 44 and into wall 68 located outside the circumference of the connection head 36. The attachment piece 43 retains the sleeve 35 fixed in both axial directions and against rotation. When pressurized liquid or compressed air is introduced through the feed line 40 into the interior of the tubular elastic members 34, the members 70 are forced apart from each other axially and bear against the friction elements 73.

To avoid damage to tubular member 34, which may consist of an elastic material such as rubber, when it is pressed against the rough walls of grooves 33 as annular members 70 are forced apart by the fluid pressure, annular shims 45 are provided at the radially inner and outer flanks of the grooves 33. Annular shims 45 may be formed of a plastic such as polytetrafluoroethylene.

The feed line 40, as illustrated in FIG. 6 is suitable only for use with the protruding end 1' of a stationary cross piece. If the damping device 50 is provided on a conventional roll in which the protruding end portion 1' rotates with the roll, a suitable rotational feed line for the elastic tubular member 34 must be provided as is indicated in FIG. 5 at 46.

During the treatment of a web of material, such as a paper web in the wet section of a paper-making machine, the rolls 10, 20, or 30 rotate in a manner well known in the art. If vibration occurs during rotation of the roll which results in a radial displacement of the protruding end portion 1', the damping housing 53 fixedly attached to end portion 1' by cone clamping connection 57 is displaced therewith. Housing 53 is moved radially relative to inertial mass rings 70 thereby causing frictional forces to develop at friction elements 73 to damp vibrational movement. The magnitude of the frictional forces developed, and hence the amount of damping provided, can be adjusted by increasing or decreasing the biasing force applied through appropriate adjustment of the pressure within tubular elastic member 34. This adjustment may be provided by a valve (schematically shown at 81) which controls the introduction and evacuation of pressure within tubular member 34. The valve 81 may be a solenoid valve controlled by a control device (schematically shown at 82) responsive to the signals from a vibration sensor (schematically shown at 83) which determines the amplitude of the vibrations of the roller. In this manner, the damping force provided may be adjusted as a function of the vibrational amplitudes produced.

I claim:

1. Apparatus for the pressure treatment of webs of material comprising:

a roll having a working roll circumference at its outer diameter;

ends protruding from the roll to which external forces may be applied for supporting the roll, each protruding end comprising an inner region extending axially outwardly from said roll and an outer region extending axially outwardly from said inner region;

an external support structure connected to the inner region of each protruding end for supporting the roll; and a device external to the roll damping vibrations of the roll during rotation thereof, said damping device being attached to, and solely supported by, one of said outer regions.

2. Apparatus according to claim 1 wherein said roll comprises a rotating hollow roll having an outer diameter defining said working roll circumference, a stationary cross piece extending through the hollow roll forming a clearance space therewith, said cross piece having portions protruding from said hollow roll defining said protruding ends, and means, including a liquid, for hydraulically supporting the hollow roll at the clearance space.

3. Apparatus according to claim 1 wherein said damping device comprises an enclosed housing having an opening which receives said outer region without radial play.

4. Apparatus according to claim 3 wherein said damping device comprises an inertial mass surrounding the outer region and a plurality of holding elements connected to the housing and the mass, permitting radial movement of the mass whereby the mass is radially movable relative to said outer region and has a rest position concentric to the outer region.

5. Apparatus according to claim 4 wherein said damping device includes means for frictionally damping vibrations of the roll.

6. Apparatus according to claim 5 wherein said inertial mass comprises a ring having a first radial end face positioned within a chamber in said housing, said chamber having a first radial wall adjacent to said first radial end face, said friction damping means comprises a first friction element positioned between said first radial end face and first radial wall.

7. Apparatus according to claim 6 further comprising means for biasing said ring against the first friction element.

8. Apparatus according to claim 7 wherein said biasing means includes means for adjusting the magnitude of the biasing force applied.

9. Apparatus according to claim 8 further comprising a sensor generating signals indicative of the vibrational amplitude of the roll, said signals operably connected to said magnitude adjusting means whereby the biasing force applied is controlled as a function of the vibrational amplitude detected by said sensor.

10. Apparatus according to claim 9 wherein said mass ring comprises two annular members having inner end faces forming a clearance space therebetween, one of said annular members having an outer end face defining said first radial end face, the other of said annular members having an outer end face defining a second radial end face, said chamber having a second radial wall adjacent to said second radial end face, said friction damping means further comprises a second friction element positioned between said second radial end face and said second radial wall whereby said biasing means forces said annular members apart and into engagement with a respective one of said first and second friction elements.

11. Apparatus according to claim 10 wherein each of said inner end faces of the annular members include a mutually facing annular groove in which said biasing means is received, said biasing means comprises a tubular elastic member actuated by fluid pressure conducted to the interior thereof and said magnitude adjusting means comprises a valve controlling the fluid pressure within the tubular member.

12. Apparatus according to claim 11 wherein said roll comprises a rotating hollow roll having an outer diameter defining said working roll circumference, a stationary cross piece extending through the hollow roll forming a clearance space therewith, said cross piece having portions protruding from said hollow roll defining said protruding ends, and means, including a liquid, for hydraulically supporting the hollow roll at the cross piece.

13. Apparatus according to claim 12 wherein said roll comprises at least part of the wet-section of a papermaking machine.

14. Apparatus according to claim 13 wherein each of said protruding ends comprises an inner region connected to a structure supporting the roll and an outer region connected to a respective damping device.

15. Apparatus according to claim 11 wherein said roll comprises a substantially solid roll having an outer diameter defining said working roll circumference and portions protruding from a central portion of the roll defining said protruding ends.

16. Apparatus according to claim 15 wherein said roll comprises at least part of the wet-section of a papermaking machine.

17. Apparatus according to claim 16 wherein each of said protruding ends comprises an inner region connected to a structure supporting the roll and an outer region connected to a respective damping device.

18. A damping device for a roll used in the pressure treatment of webs of material comprising:
(a) an enclosed housing having means for connecting the device to an end of a roll without radial play;
(b) means for damping roll vibrations including
(i) an inertial mass; and
(ii) a plurality of holding elements connected to the housing and the mass, permitting radial movement of the mass
whereby the mass is radially movable relative to the housing.

19. A damping device according to claim 18 further comprising means for frictionally damping vibrations of the roll.

20. A damping device according to claim 19 wherein said inertial mass comprises a ring having a first radial end face positioned within a chamber in said housing, said chamber having a first radial wall adjacent to said first radial end face, said friction damping means comprises a first friction element positioned between said first radial end face and first radial wall.

21. A damping device according to claim 20 further comprising means for biasing said ring against the first friction element.

22. A damping device according to claim 21 wherein said biasing means includes means for adjusting the magnitude of the biasing force applied.

23. A damping device according to claim 22 wherein said mass ring comprises two annular members having inner end faces forming a clearance space therebetween, one of said annular members having an outer end face defining said first radial end face, the other of said annular members having an outer end face defining a second radial end face, said chamber having a second radial wall adjacent to said second radial end face, said friction damping means further comprises a friction element positioned between said second radial face and second radial wall whereby said biasing means forces said annular members apart and into engagement with a respective one of said first and second friction elements.

24. A damping device according to claim 23 wherein each of said inner end faces of the annular members include a mutually facing annular groove in which said biasing means is received, said biasing means comprises a tubular elastic member actuated by fluid pressure conducted to the interior thereof and said magnitude adjusting means comprises a valve controlling the fluid pressure within the tubular member.

* * * * *

UNITED STATES PATENT AND TRADEMARK OFFICE
CERTIFICATE OF CORRECTION

PATENT NO. : 4,910,842
DATED : March 27, 1990
INVENTOR(S) : Bernhard Brendel

It is certified that error appears in the above-identified patent and that said Letters Patent is hereby corrected as shown below:

In Column 10, line 38, (claim 23), delete "...a friction.."

and substitute --...a second friction...--

Column 10, line 39 (claim 23), delete "...second radial face..." and substitute --...second radial end face...--

Signed and Sealed this

Fourteenth Day of May, 1991

*Attest:*

HARRY F. MANBECK, JR.

*Attesting Officer*   *Commissioner of Patents and Trademarks*